(12) United States Patent
Muller et al.

(10) Patent No.: US 9,337,958 B2
(45) Date of Patent: May 10, 2016

(54) DATA TRANSMISSIONS OVER A VOICE CHANNEL

(71) Applicant: Sogics Corporation Ltd, Hong Kong (HK)

(72) Inventors: Arnaud David Nicolas Muller, Kuala Lumpur (MY); Chieh-Yuan Chao, Fremont, CA (US)

(73) Assignee: Sogics Corporation Limited, Hong Kong (HK)

( * ) Notice: Subject to any disclaimer, the term of this patent is extended or adjusted under 35 U.S.C. 154(b) by 0 days.

(21) Appl. No.: 14/629,300

(22) Filed: Feb. 23, 2015

(65) Prior Publication Data

US 2015/0244500 A1 Aug. 27, 2015

Related U.S. Application Data

(60) Provisional application No. 61/943,284, filed on Feb. 21, 2014.

(51) Int. Cl.
| | | |
|---|---|---|
| *H04L 1/00* | (2006.01) | |
| *H04B 1/38* | (2015.01) | |
| *H04L 1/08* | (2006.01) | |
| *H04L 1/18* | (2006.01) | |
| *H04L 5/14* | (2006.01) | |
| *H04L 27/00* | (2006.01) | |

(52) U.S. Cl.
CPC .............. *H04L 1/0054* (2013.01); *H04B 1/38* (2013.01); *H04L 1/0003* (2013.01); *H04L 1/0015* (2013.01); *H04L 1/08* (2013.01); *H04L 1/1867* (2013.01); *H04L 5/143* (2013.01); *H04L 27/0008* (2013.01)

(58) Field of Classification Search
CPC ... H04L 1/0003; H04L 1/0006; H04L 1/0035; H04L 1/0015; H04L 1/0054; H04L 1/08; H04L 1/1867; H04L 27/0008; H04L 5/143; H04W 76/025; H04W 4/22; H04W 76/007; H04N 19/164; H04B 1/38
See application file for complete search history.

(56) References Cited

U.S. PATENT DOCUMENTS

| | | | | |
|---|---|---|---|---|
| 6,490,260 | B1 * | 12/2002 | Hwang | 370/335 |
| 6,493,338 | B1 * | 12/2002 | Preston et al. | 370/352 |
| 8,249,865 | B2 * | 8/2012 | Birmingham | 704/221 |
| 8,416,734 | B2 * | 4/2013 | Snow et al. | 370/324 |
| 2002/0001317 | A1 * | 1/2002 | Herring | H04W 76/025 370/493 |
| 2009/0276671 | A1 * | 11/2009 | Fang et al. | 714/748 |
| 2009/0306974 | A1 * | 12/2009 | Huang et al. | 704/211 |
| 2013/0003611 | A1 * | 1/2013 | Hans | 370/259 |
| 2013/0263201 | A1 * | 10/2013 | Chung-How et al. | 725/116 |

* cited by examiner

*Primary Examiner* — Sophia Vlahos
(74) *Attorney, Agent, or Firm* — Venture Pacific Law, PC

(57) ABSTRACT

A modem for communicating application data over a voice channel comprises an adaptive modulator, a mixer, and a vocoder. The adaptive modulator modulates application data as a function of a source application of the application data and feedback information of the voice channel. The modulated data is inputted to the mixer. The vocoder processes the mixed data for transmission through the voice channel.

15 Claims, 6 Drawing Sheets

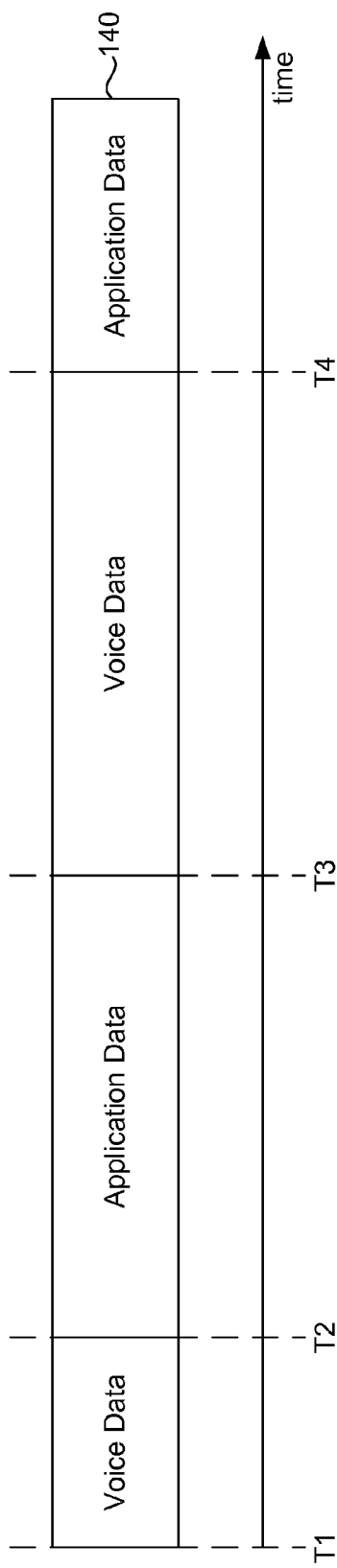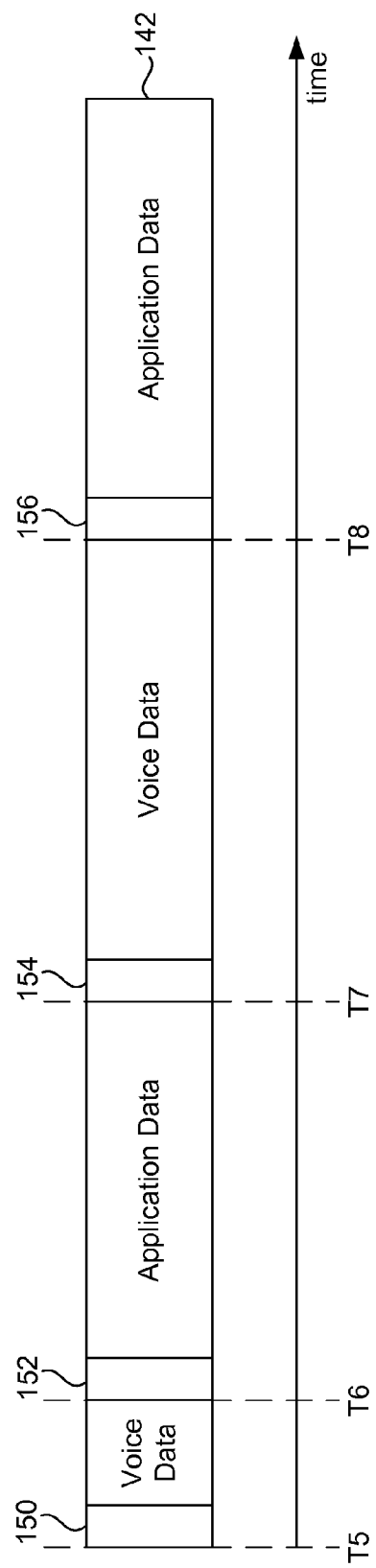

DATA TRANSMISSIONS OVER A VOICE CHANNEL

CROSS REFERENCE

This application claims priority from a provisional patent application entitled "Method and System For Transmitting and Receiving Data Over A Voice Channel" filed on Feb. 21, 2014 and having an Application No. 61/943,284. Said application is incorporated herein by reference.

FIELD OF INVENTION

The disclosure relates to data and voice communications, and, more particularly, to methods, apparatuses, and systems for communicating data over a voice communications channel.

BACKGROUND

A voice communication service is one of the most fundamental, ubiquitous, and reliable application in various public communication networks, including landline and wireless communication networks. Source compression engines within wireless cellular networks, namely digital audio and voice codec, enable a bandwidth efficient and reliable means for digital voice communications. Typically, a two-way digital voice pathway is established in such digital voice communications that is an ideal transmission media for secure and bandwidth efficient data communications over the voice pathway.

Given limited bandwidths in a communication system, the voice channels will always take precedence over data channels and are given the highest priority with guaranteed performance on voice related services. On the other hand, current data services using data channels or voice channels, e.g., short message service ("SMS"), do not have guaranteed connections, data speeds, real-time delivery, or success of delivery, among many other quality-of-service ("QoS") factors. Under a heavy load or overloaded network conditions, the communication system automatically redistributes its resources to ensure the quality of voice-related service over voice channels. Under certain other conditions where the SNR (signal-to-noise ratio) is low or handover is not smooth, only voice service is kept as the data service over the network will be interrupted or even completely dropped. This poses reliability and security issues with today's communication systems and applications. It is even more pronounced in the mobile-health, mobile-banking/commerce, mobile safety, and data streaming applications, where reliable and secure data transmission are needed most.

For instance with mobile-health application, personal data may be exposed to at least one wireless data communications network along the data path while being uploaded. The personal data can be intercepted along the data path and used by a third party (e.g., a criminal) since the data path is not entirely secure. Furthermore, the personal data is not guaranteed on-time nor guaranteed for successful delivery to its destination, which leaves doctors with incomplete or incorrect medical data of their patients. This raises serious reliability and security concerns for both the service providers and the subscribers.

For mobile-banking/commerce applications, confirmation on timely and secure transaction information is paramount. Any failure along the data path in the data communications network will greatly decrease and hinder banking transactions. Furthermore, reliable and secure communication is also paramount in exchanging real time information between a mobile unit and service providers. However, any lack of data network access will hinder any surveillance, monitoring, and remote access of such safety applications.

Therefore, there exists a need for providing a new secure and robust communications system and devices that can transmit data over a more prioritized communication path (e.g., a voice channel), which is more reliable and secure than solely transmitting over a data channel. There exists a need where portions of sensitive data are routed through different communications path (e.g., a data channel and a voice channel), such that retrieving the sensitive data would require data from all the communications paths. Additionally, there exists a need such that sensitive data can be sent either as redundant transmission or as the only transmission through a voice channel, as in on-demand packets or streamed data.

SUMMARY OF INVENTION

Briefly, the disclosure relates to a modem for communicating application data over a voice channel, comprising: an adaptive modulator, wherein the adaptive modulator modulates application data as a function of a source application of the data and feedback information of the voice channel; a mixer, wherein the modulated data is inputted to the mixer; and a vocoder, wherein the vocoder processes the mixed data for transmission through the voice channel.

DESCRIPTION OF THE DRAWINGS

The foregoing and other aspects of the disclosure can be better understood from the following detailed description of the embodiments when taken in conjunction with the accompanying drawings.

FIG. 4 illustrates a data stream of the present disclosure having voice data and application data.

FIG. 5 illustrates a data stream of the present disclosure having headers to identify between voice data and application data in the data stream.

DETAILED DESCRIPTION OF THE EMBODIMENTS

In the following detailed description of the embodiments, reference is made to the accompanying drawings, which form a part hereof, and in which is shown by way of illustration of specific embodiments in which the disclosure may be practiced.

An in-band modem of the present disclosure can use two-way digital voice communication pathways, i.e., voice channels that are pre-established through wired, cellular, or other wireless communication channels as a data transmission media. Furthermore, bandwidth efficient means for secure data communications via the voice channels are provided. An in-band modem can be embedded in a communication apparatus at the endpoints of a pre-established two-way voice communication path to achieve secure, efficient, and robust data communication for user applications. The in-band modem can also be embedded at various points in the communications path as well.

Point-to-point data exchange between peer users, or point-to-multipoint client-server structure can be established over voice channels using methods, systems, and apparatuses of the present disclosure. For instance, a point-to-point secure data exchange between users can be a standalone application, where end users simply attach an in-band modem to a digital voice interface of the end user's wireless/cellular device. Once voice communication has been established between two endpoints, the in-band modem can use the pre-established digital voice communication path as a data transmission media.

In addition, point-to-multipoint client-server architecture can take advantage of the multitasking or multi-threading capacity of the server side to initiate multiple point-to-point secure data exchange links. The server functions as a hub for data sharing and routing. Both the client and server functionalities are at the application layer, which can be installed on a mobile unit or a service center, as long as the target device meets hardware requirement. The mobile server can require hardware support to multiple independent connections of cellular/wireless voice communication channels. In a server configuration, the communication pathway between a server and a client can be established through a voice channel such that data can be transferred between the server and the client through the voice channel.

Figure 1:
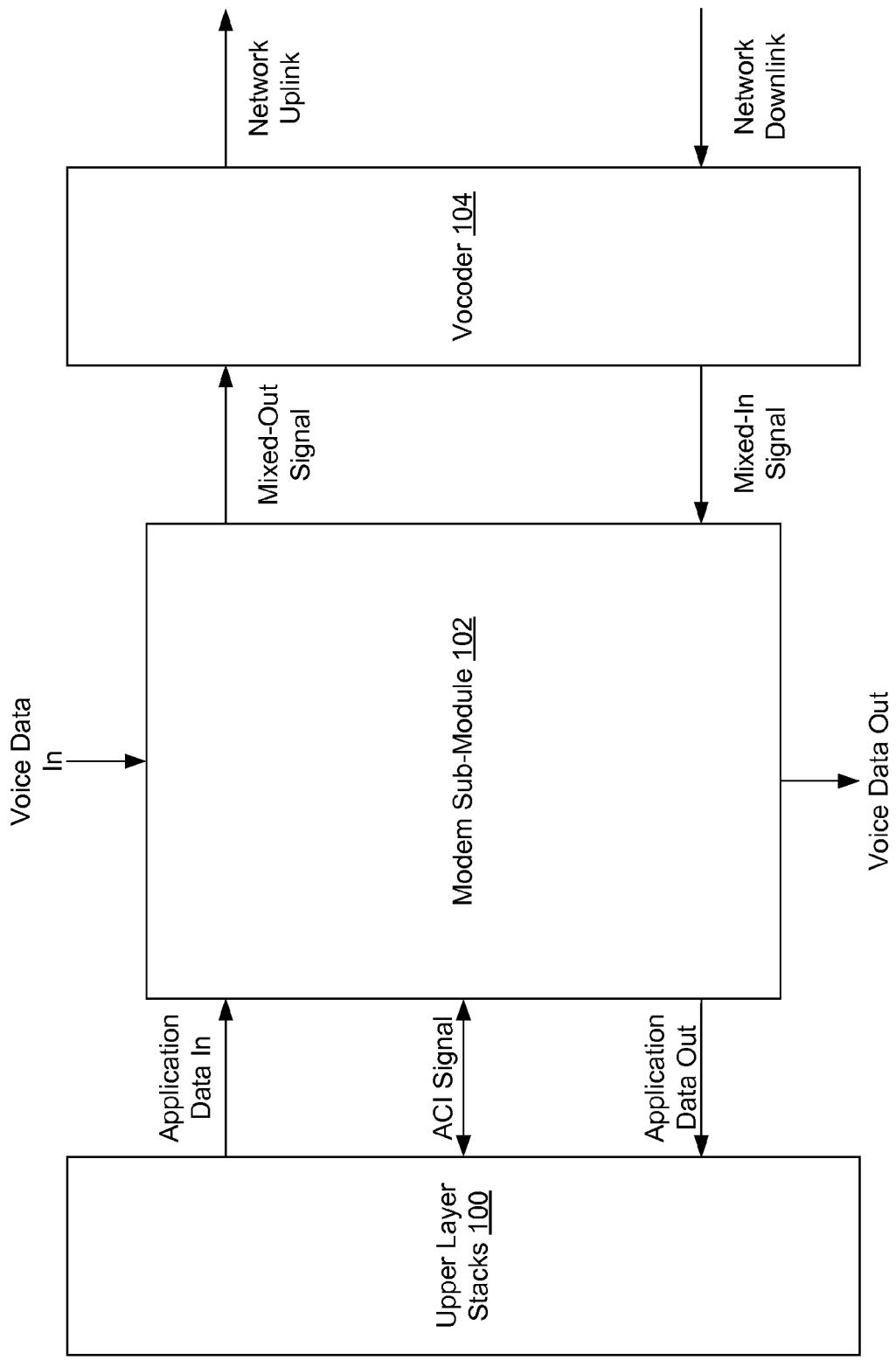
FIG. 1 illustrates a block diagram of an in-band modem of the present disclosure.

FIG. 1 illustrates a block diagram of an in-band modem of the present disclosure. An in-band modem of the present disclosure comprises upper layer stacks 100, a modem submodule 102, and a vocoder 104. The upper layer stacks 100 can be provided according to the international organization for standardization ("ISO") protocol stack. Specific implementations are well known in the art. Various implementations can be used in accordance with the ISO protocol stack.

A modem implementation can be present within a top layer (i.e., the application layer) of ISO protocol stack. The application layer can be structured with multiple sublayers, including a waveform layer, a data-link layer, a security layer, and several other upper user application layers. The upper layers should be customized for user applications of various kinds, including mobile health, mobile banking/commerce, automotive telemetry and safety system, etc. The security sublayer provides end-user data encryption and authentication either through the existing security methods of the respective application or through proprietary technology. The data-link sublayer performs data integrity checks, automatic data retransmission, traffic flow control, and other handshaking protocols that support upper layer data sharing and routing applications. The waveform sublayer handles signal processing details for data communications over digital voice channel. In particular, this layer maps user data into encrypted user signal waveform optimized to withstand signal distortion introduced by source compression/decompression engine. The waveform sublayer also encapsulates both transmission and reception capabilities.

In a practical system design and implementation, multiple logically separated sublayers such as security sublayer, data-link layer, and waveform sublayer can be merged into one physical implementation entity, namely the submodule 102 having an adaptive control interface ("ACI"), in favor of system efficiency, protocol overhead savings, and security improvement.

The upper layer stacks 100 can transfer application data in and out of the modem submodule 102. An ACI control signal can also be inputted to the modem submodule 102 from the upper layer stacks 100. The modem can have voice data inputted to the submodule 102 for mixing with the application data from the upper layer stacks 100. Voice data is optional, depending on the application. Any voice data and the application data are mixed together by the modem submodule 102 to generate a mixed-out signal. The mixed out signal is passed to the vocoder 104 for encoding and transmission through a network uplink (e.g., either a wired link, a wireless link, a cellular link, an internet link, or other network link).

For receiving transmission over a voice channel, the modem can receive data over a network downlink. The vocoder 104 decodes that received data into a mixed-in signal having the voice data (if any) and the application data from the network downlink. The mixed-in signal is inputted to the submodule 102, where the submodule 102 separates the voice data and the application data from the mixed-in signal. The voice out data (if any) is outputted as the voice out and the application data is outputted back to the upper layer stacks 100.

Figure 2:
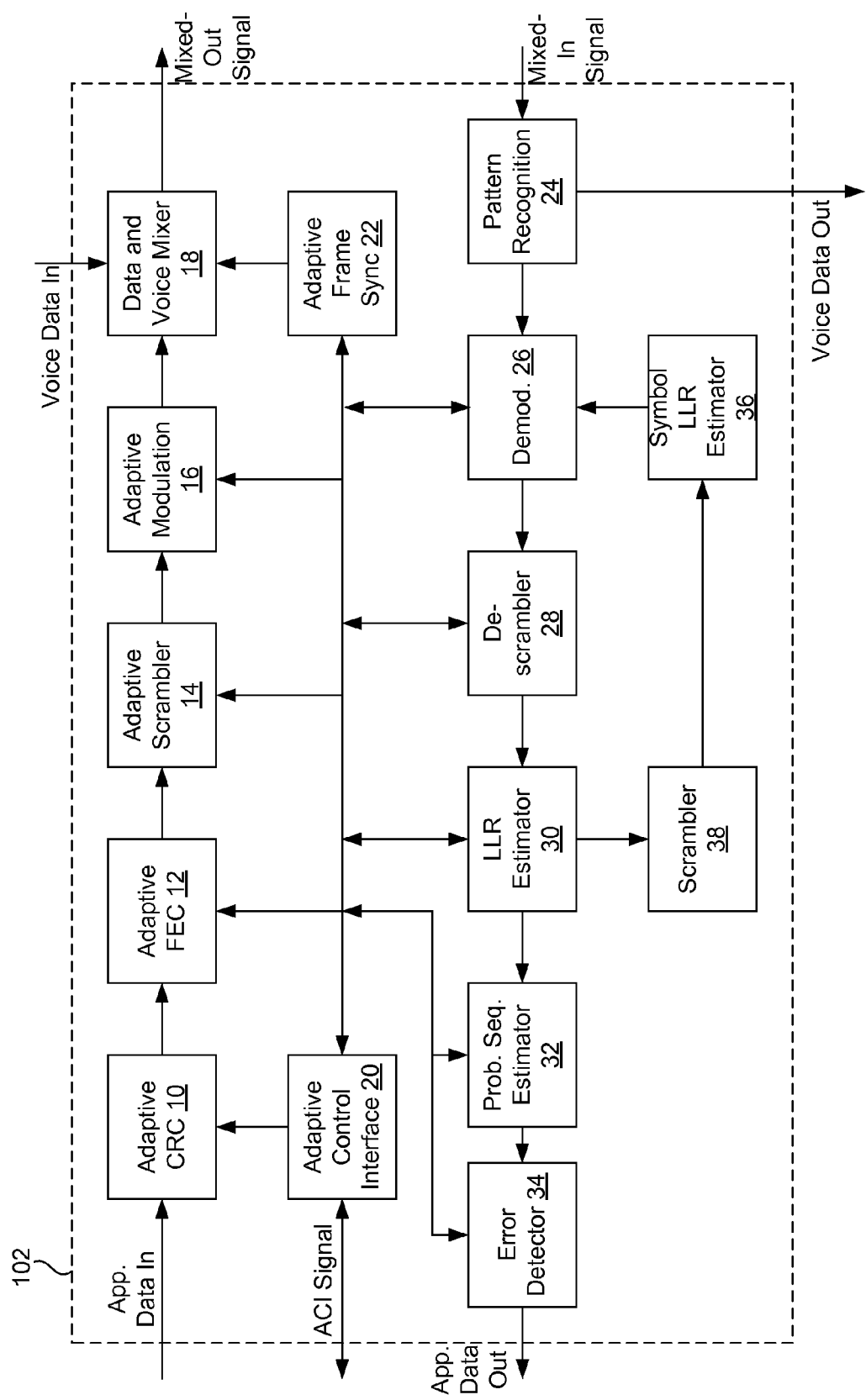
FIG. 2 illustrates a block diagram of a submodule of an in-band modem of the present disclosure.

FIG. 2 illustrates a block diagram of a submodule of a modem of the present disclosure. The submodule 102 comprises an adaptive cyclic redundancy check ("CRC") module 10, an adaptive forward error correction ("FEC") module 12, an adaptive scrambler 14, an adaptive modulator 16, a data and voice mixer 18, an adaptive control interface 20, an adaptive frame synchronizer 22, a pattern recognition module 24, a demodulator 26, a descrambler 28, a bit-based estimator 30, a probabilistic sequence estimator 32, an error detector 34, a symbol estimator 36, and a scrambler 38. The above components and connections of the submodule 102 are logical blocks and outline the data flow and/or control flow of the submodule 102. Actual implementations may vary, and may have overlapping implementation between certain logical blocks in the submodule 102 or with modules located elsewhere within the modem. The control and data signals can be routed within and through the ACI 20 in various manners, including the following three paths: transmission path, receiving path, and system control path.

In a transmission path, application data in (i.e., app. data in) can be encoded and/or encrypted by the adaptive CRC 10, the adaptive FEC 12, and the adaptive scrambler 14 to ensure data integrity. The adaptive CRC 10, the adaptive FEC 12, the adaptive scrambler 14, and the adaptive modulation 16 can be adjusted on the fly by the ACI 20 either by a user request or based on feedback information that can be sent from a receiver modem of the application data.

There can be multiple modulation waveforms available either individually and/or concatenated modulation waveforms for selection depending on the respective applications of the application data and feedback information. The adaptive frame synchronizer 22 can also have multiple formats to comply with specific communication standards and/or performance requirements. As the operation of the adaptive CRC 10, the adaptive FEC 12, the adaptive scrambler 14, and/or the adaptive modulation 16 changes, the adaptive frame synchronizer 22 can change frame size, frame timing, and/or make other changes to the mixed-out data signal on the fly.

Voice input can be optionally added to the application data by the data and voice mixer 18. The mixer 18 generates a mixed-out signal to be inputted to the vocoder 104 for transmission via a network uplink. The ACI 20 can operate the components of the submodule 102.

System throughput and transmission latency can be improved by dynamically adjusting FEC code rate and/or structure, modulation waveform and constellation, and channel scramble pattern in the signal transmission path according to forward channel statistics, channel capacity, SNR measurement, and/or other voice channel characteristics. The submodule modem 102 can be equipped with parallel functional modules, each supporting a variety of operating modes and user configurable via a system control path.

Several control mechanisms can be used to achieve adaptive waveform transmission, e.g., an open loop or close loop method. The open loop method autonomously scales up signal redundancy after every retransmission until an acknowledgement ("ACK") from a remote device is received. The close loop method continuously uses channel feedback to collect forward channel status information, and makes adjustment to its subsequent transmission redundancy.

The ACI 20 can be an abstraction that encapsulates all the modular designed components for the functionality of security sublayer, data-link layer, and waveform sublayer. Within the ACI 20, several embodiments for each sublayer capability may coexist in the form of cascaded functional components and made available to user applications layer through a user application programming interface ("API"). Through its API, all the modular design components can be accessed and configured dynamically for different user application with varying channel status information. The ACI can then provide a flexible and secure SDK platform so that the system architecture of user applications can be software defined.

The CRC module 10 can append application data with a redundancy check for error detection. One of the key elements of the CRC module 10 is its generation of a polynomial of degree N, e.g., g(D) over binary field {0,1}.

$$g(D) = a0 + a1*D + a2*D2 + \ldots + an*DN \qquad \text{Equation [1]}$$

with delay operator D and binary coefficients ai.

Suppose an arbitrary binary data sequence of length L+1 is {m0, m1, m2, . . . mL}, then an input sequence polynomial m(D) can be defined as m(D)=0+m1*D+m2*D2+ . . . +mL*DL, where D is the delay operator and coefficients mi denote user data bits. The user data m0 is the least significant bit ("LSB") while mL is the most significant bit ("MSB"), all being defined over a binary field {0, 1}. The output polynomial of the CRC module 10 can be $$y(D) = m(D)*DN + (m(D)*DN \% g(D)) \qquad \text{[Equation 2]}$$

where y(D) has length L+N+1 and where % is a polynomial modulo operation over the binary field. The coefficients of y(D) are the CRC output data sequence. The CRC module 10 can be further compounded with data encryption features through a built-in security component.

The adaptive FEC 12 can be a hybrid automatic repeat request ("ARQ") based FEC. For instance, UMTS turbo codes can be used here as the basic FEC component along with its rate compatible puncture pattern to safeguard data integrity through incremental redundancy based retransmission. Under normal channel quality, a single transmission should be sufficient for the receiver to recover the entire user data sequence. However, wireless channel fading may cause serious impairment to voice channel quality in the forms of signal distortion, burst erasure, and error. If it is due to voice channel degradation, single transmission may not be sufficient for the receiver to recover the user data sequence. The data link layer hybrid ARQ protocol can trigger automatic retransmission of the application data using different modulation waveforms until an ACK message from the receiving modem has been received by the transmitter modem. In certain embodiments, the application data can be broadcast using a plurality of modulation waveforms, in the hope that one of the modulated application data transmissions will be fully received by the receiving modem.

An intrinsic interleaver of size N with specified spreading factor can be used between two constituent codes to improve hamming distance and consequently coding gain, where N is the size of input sequence. In an embodiment of the present disclosure, the adaptive scrambler 14 is a block interleaver. A generic rectangular interleaver of size M*N can be used for targeting at burst error of size N.

An input bit sequence can be defined as {xi}, where i=0, 1, 2, . . . M*N−1 and the output sequence as {yj}, where j=0, 1, 2, M*N−1. The following equation can be found:

$$yj = xi, \text{ where } j = [i/N] + (i\%N)*M, \qquad \text{[Equation 3]}$$

where [*] is a floor operation, and "%" denotes a modulo N operation.

In another embodiment of the present disclosure, the adaptive scrambler 14 is a convolutional interleaver. The key functionality of each embodiment is to scatter channel block erasures or clustered errors pattern, which are caused by channel packet loss or false positive detection, into isolated random error/erasure pattern correctable by hybrid-ARQ based FEC 12.

The adaptive modulator 18 can map sequential data bits into one or more signal constellations and signature waveforms. The hamming distance of the FEC code can be translated into a Euclidean distance of N-dimensional vector space.

A mobile voice channel poses a very unique challenge where data must go through the complex voice coder-decoder ("vocoder"), whereas other pure data channels do not have such process limitations. The vocoder is especially designed to process voice, such that any data that does not resemble voice may be treated as noise and ultimately discarded.

When transmitting over bandwidth efficient digital voice channel, enabled by complex voice compression engine, user signal waveform may occasionally experience severe channel impairment induced by non-linear signal distortion and parametric quantization error at voice compression engine, packet loss concealment artifacts at decompression engine, or burst channel error or erasure due to wireless channel fading and receiver white noise.

A channel modulation scheme as detailed in the present disclosure can be engineered to maximize Euclidean distance given the foreknowledge of FEC code structure and its minimum hamming distance. The modulation scheme can also withstand various channel impairments caused by wireless channel fading and voice compression. In particular, the adaptive modulation module 18 can have a unique set of signature waveforms customized for individual voice codec models that minimize distortion of application data that passes through the vocoder.

Various modulation waveforms and tones include phase-shift keying ("PSK"), quadrature PSK, 8-bit quadrature amplitude modulation ("QAM"), 16-bit QAM, 32-bit QAM, 64-bit QAM, 128-bit QAM, sine modulation, cosine modulation, proprietary modulation waveform, etc. In one embodiment, the modulation waveform can be determined based on the channel feedback information. For instance, if the transmission signal from the respective transmitter is strong, a higher modulation (e.g., 128 QAM) can be used for greater throughput and greater efficiency. If the transmission signal is bad (i.e., losing bits on the receiver side), a lower modulation can be used for greater redundancy (including CRC, FEC, etc. added into the payload of the transmission) having less efficiency to assure better reception of the application data on the receiver side. Thus, the adaptive modulation module 18 can adjust the type of modulation waveform on the fly depending on the channel feedback information from the receiver and the source application of the application data. The determined modulation can be further tailored to the particular source application of the application data. For instance, for eCall, an emergency protocol standard, there can be a specific modulation that must be in accordance with eCall.

The adaptive frame synchronizer 22 can be used to separate the application data signal waveform from voice data. It also can be used to identify a starting point of application data frame. The proposed frame sync pattern is robust especially to channel impairment due to non-linear signal distortion and parametric quantization error of voice compression engine. Likewise, frame sync and preamble block can have many embodiments, where each embodiment corresponds to a specific voice codec model. The adaptive frame synchronizer 22 is an optional module depending on the whether the receiver modem requires the use of headers to identify the types of data being transmitted.

The mixer 18 outputs weighted average of digital voice input, user frame sync preamble signal, and modulated application data waveform. The weighting factor of each input source can be a time varying function. In particular, the output sequence of the mixer 18 can be denoted by the following equation:

$$O(n)=W(n)*Cw(n)+V(n)*Cv(n)+S(n)*Cs(n), \quad \text{Equation [4]}$$

where n is the element index of each digital signal sequence. The function W( ) denotes a digital waveform signal sequence of application data, V( ) denotes a digital voice signal sequence, while S( ) denotes a frame sync and preamble signal sequence. The function Cw( ) denotes a time varying weight sequence for the digital waveform signal, Cv( ) denotes a time varying weight sequence for the digital voice signal, while Cs( ) denotes a time varying weight sequence for the frame sync and preamble signal.

In an embodiment of the present disclosure, the mixer 18 can use a time sharing mechanism, where all the time varying weight sequences are orthogonal, e.g.

$$Cw*Cv=0, Cw*Cs=0, Cv*Cs=0. \quad \text{Equation [5]}$$

In the receiving path, if any voice data is in the mixed-in signal, the pattern recognition module 24 can extract the voice data. The pattern recognition module 24 can use various signal processing techniques to locate frame sync preamble signal and identify symbol timing and frame timing information of each transmission. Since the transmitted user data waveform has outstanding time and frequency features, it can be identified and separated from voice signal with reasonable complexity.

In case of a time sharing scheme, due to the foreknowledge of different weighting sequences for Cv, Cw, and Cs, once the symbol timing and frame synchronization information have been extracted for each transmission, corresponding signal alignments can be determined and the signal can be normalized. The Cw, Cv, and Cs sequences could be applied as a filter to extract the user waveform sequence. The voice data is outputted as voice data out.

The application data of the mixed-in signal is demodulated by the demodulator 26. The demodulator 26 derives bit-based channel LLR from the symbol LLR estimator 36's output and symbol waveform output of pattern recognition 24. The demodulator 26 after being integrated with other components, i.e., descrambler 28, LLR estimator 30, scrambler 38, and symbol LLR estimator 36, can apply an iterative demodulation and decoding architecture taking advantage of information correlation of the channel modulation and the coding to formulate a positive feedback amplifier for a bit-probabilistic-likelihood ratio.

The demodulator 26 outputs channel observation for each application data bit in the metric of log-likelihood ratio, as input to the LLR estimator 30 after being descrambled by the descrambler 28. The intrinsic information correlation embedded within the application data bits by the adaptive FEC 12 of the transmitting modem are estimated in a bit based LLR metric by the log-likelihood-ratio ("LLR") estimator 30 for every user information bit. The symbol LLR estimator 36 derives symbol based LLR metric from the bit based LLR metric.

A feedback loop comprises the symbol LLR estimator 36 and the scrambler 38, which is added to further enhance the accuracy of data. The bit-based LLR estimator 30 outputs to the scrambler 38. The scrambler 38 scrambles the data and inputs that scrambled data to the symbol LLR estimator 36, which estimates the LLRs for symbols. The symbol LLR estimator 36 outputs to the demodulator 26. Enabled by a data link layer hybrid ARQ mechanism, successive application data retransmissions are collected and assembled at the modem at the receiving end to be processed for data estimation refinement. Data link layer hybrid ARQ can also trigger automatic retransmission of the application data using different modulation waveforms until an ACK message from the receiving modem has been received by the transmitter modem. The best estimated result will be generated by a probabilistic sequence estimator 32, and then sent to the error detector 34. The error detector 34 applies user defined CRC to detect any errors. The error-free application data with the highest probability are outputted by error detector 34 to the upper layer stacks 100. In case of default, e.g. no error-free sequence found after retransmissions time-out, packet loss may be reported to upper layer stacks 100.

Once the likelihood of each bit has been derived from iterative processing, maximum likelihood sequence estimation algorithm can be used to search for sequences with sufficient confidence in the measure of likelihood probability. More than one data sequence might pass the sufficient confidence test. These remaining candidate sequences then must pass through the error detector 34 for CRC check.

The error detector 34 can filter out a false positive sequence simply by taking a modulo operation of the candidate data sequence polynomial over the same generator polynomial g(D). Any arbitrary non-zero residual polynomial is an indication of data sequence error. If more than one candidate passes the CRC test, the one with highest likelihood probability will be chosen as the user data output. Once a data sequence has been extracted, an ACK message should be generated and sent to the remote transmitting device through the transmitting path of local device for the receiving modem.

If the receiving path incurs any distorted data or missing data, a message can be transmitted back to the sender requesting for adjustments in the transmission of data over the network link(s), and, possibly, retransmission of any distorted or missing data. The sender can use this feedback to adjust the modulation waveform to improve transmission to the receiving modem.

In the system control path, the application data transmission and detection are analyzed and managed by the ACI 20. The ACI 20 stores multiple protocol stacks with interchangeable CRC protocols, FEC protocols, scrambler algorithms, modulation waveforms, frame sync algorithms, pattern recognition algorithms, bit LLR estimators, symbol LLR estimators and sequence estimators. Modules that are in the signal transmitting path and receiving path can be dynamically configured in real-time to meet the system demands. Data encryption and decryption can be applied either with hardware or software, or the combination of both.

Figure 3:
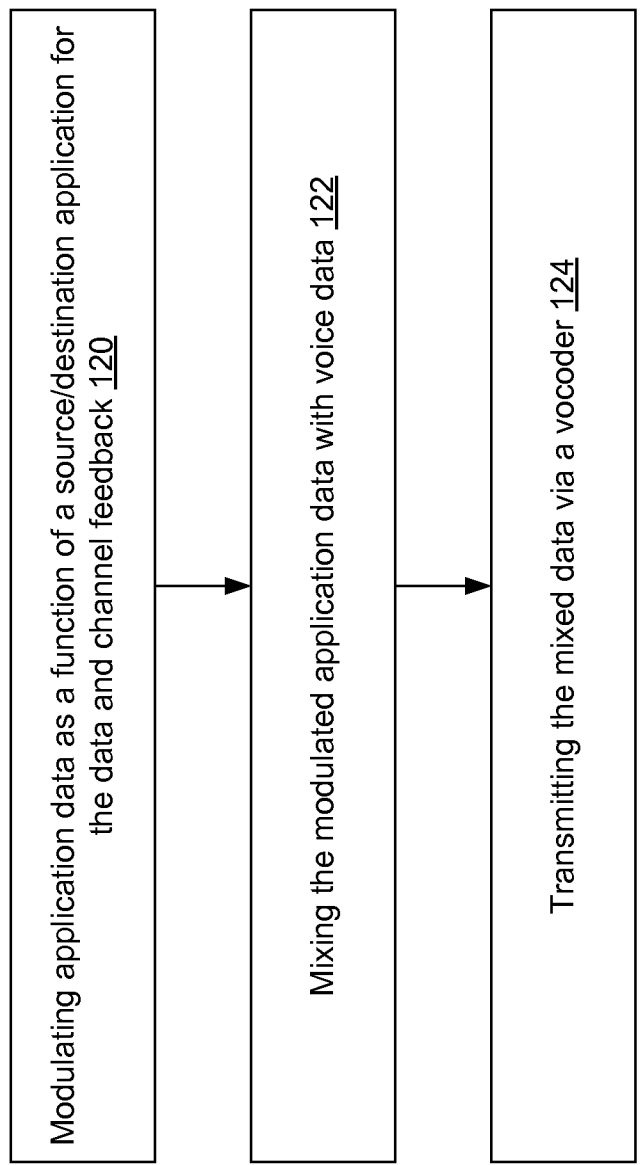
FIG. 3 illustrates a flow chart for a method of the present disclosure to transmit application data over a voice channel.

FIG. 3 illustrates a flow chart for transmitting data over a voice channel using a method of the present disclosure. Application data is modulated as a function of a source/destination application for the data and the channel feedback 120. For instance, various distortions can occur to the application data along the transmission path to a receiver, which can be caused by passing through a vocoder, multipath distortion, or other transmission media distortions. The modulated data can then be mixed with voice data, if any, 122 to be transmitted together over a voice channel. It can be assumed that a voice communication path has been pre-established. The voice data is optional since the modulated data may be transmitted over the voice channel. The mixed data is then transmitted via a vocoder 124.

FIG. 4 illustrates a data stream having voice data and application data. Mixed data 140 can comprise voice data and application data blocks. The mixed data 140 can be segmented in time with voice data between times T1 and T2, application data between times T2 and T3, voice data between times T3 and T4, and application data from time T4 and onwards. The receiver of the mixed data 140 can distinguish between the two data types by using a pattern recognition module to search for any speech patterns. Any portion that is recognized as a speech pattern can be processed as voice data, and any other blocks are processed as application data. In other embodiments, other methods can be used to determine whether voice data or application data has been received in the mixed data 140.

FIG. 5 illustrates a data stream having headers to identify between voice data and application data. The mixed data 142 can segmented in time with voice data between times T5 and T6, application data between times T6 and T7, voice data between times T7 and T8, and application data from time T8 and onwards. Headers 150-156 can precede the respective voice data and the application data in the mixed data 142 to identify the type of data to follow the respective header. During transmission, the adaptive frame synchronizer of the transmitting modem can insert headers to indicate to the receiver of the mixed-out signal what type of data is to follow, e.g., whether application data or digitized voice data is to follow. The receiver of the mixed data 142 can then use the header information to distinguish between the two data types of voice data and application data. For instance, the pattern recognition module (or other logic block of the modem for reading headers, e.g., a decoder, vocoder, etc.) can be used to process the header information. The pattern recognition module can be adaptive in that in can switch on the fly between various methods for separating the voice data and the application data, including reading any header information in the frames, using speech pattern recognition, or by other methods for separating the voice data and the application data.

Figure 6:
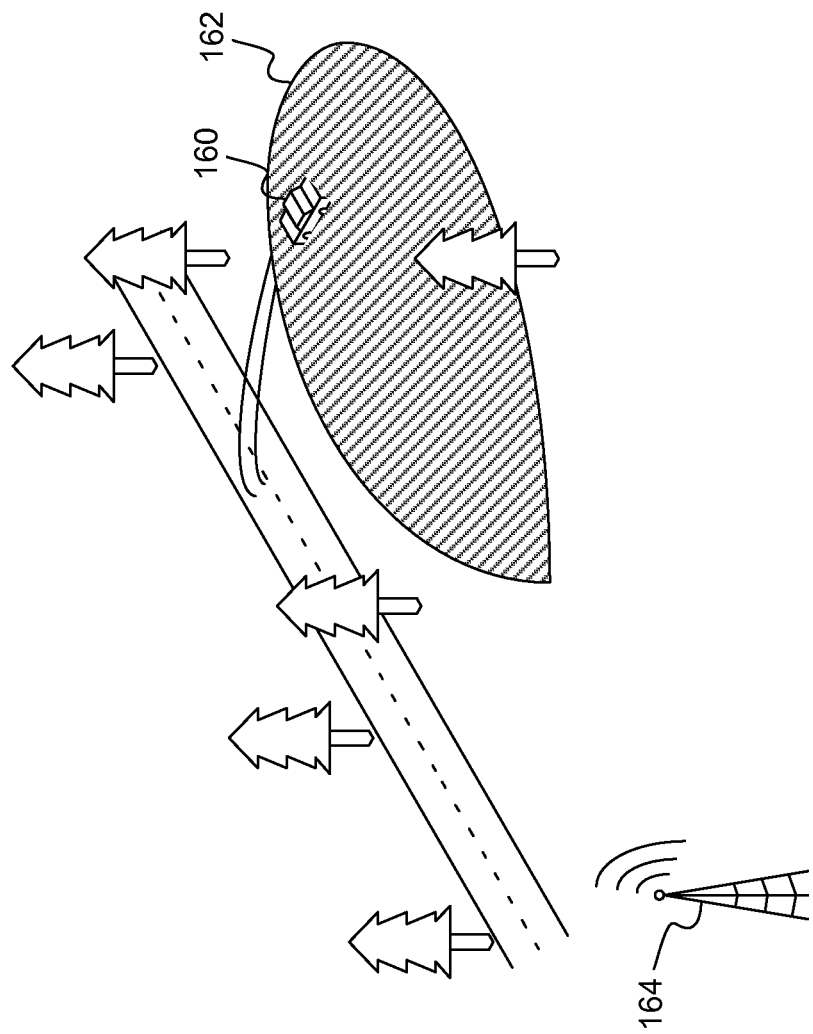
FIG. 6 illustrates a diagram of an example in which the present disclosure can be applied.

FIG. 6 illustrates a diagram of an example in which the present disclosure can be applied. Telematics services, such as European's eCall and GM OnStar, have pre-defined protocols and standards that are becoming regulated by the local governments. The present disclosure can be used to implement multiple protocols, including eCall or OnStar, and has the flexibility to run a standalone application or multiple applications simultaneously. The claimed system can also increase the overall performance by modifying the coding process and giving the freedom to implement various protocols. Within certain protocols where data safety and security are not specified but required, the claimed structure can also encrypt the data according to specific requirements.

In an example, if a car 160 loses control and ends up stranded in a pond 162. The car 160 can automatically initiate a distress call via a cellular tower 164 to an emergency call center or server. The car 160 can transmit application data, including global positioning system ("GPS") location of the car 160, the state of the car 160, and any other information via a voice channel through the cellular tower 164. If the driver of the car 160 wants to add any information or provide further details, the driver can also provide voice data by speaking into a microphone in the car 160. The voice data and the application data can be mixed and transmitted over the voice channel.

Figure 7:
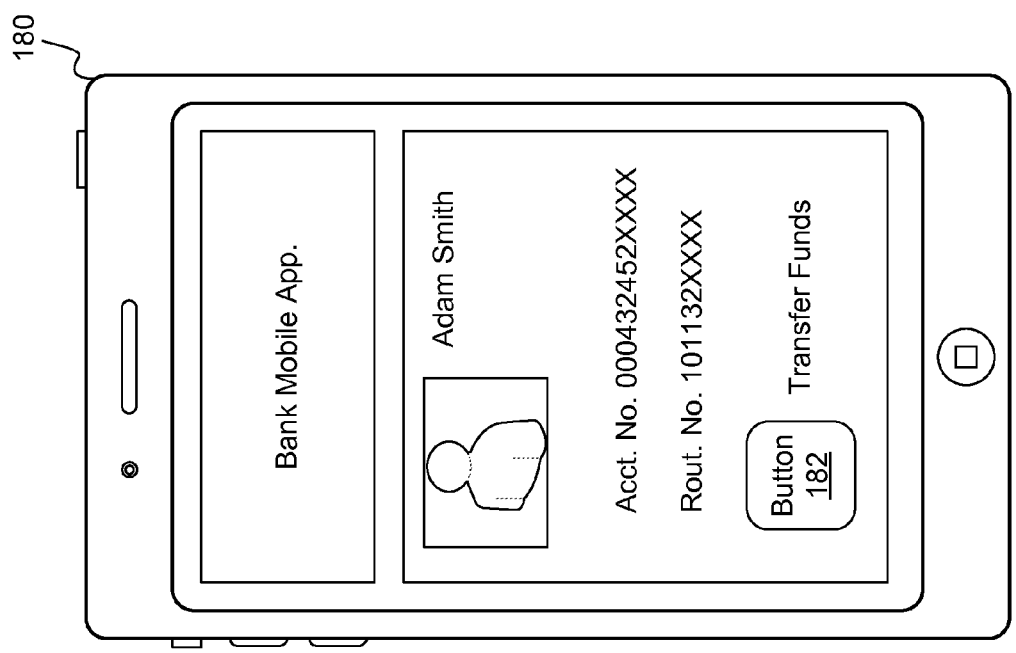
FIG. 7 illustrates a diagram of another example in which the present disclosure can be applied.

FIG. 7 illustrates a diagram of another example in which the present disclosure can be applied. Current applications exclusively use wired or wireless data transmissions. A voice channel does not typically have enough capacity to handle the throughput required for such applications. In addition, mobile commerce and banking may often require timely confirmation from a user (e.g., a client) and/or a service provider (e.g., a server). In situations where mobile data service is interrupted (or not available), critical data such as confirmation can be sent using the voice channel (if available) where the coverage is more guaranteed, thus more robust and secure to ensure the continuity of services. Alternatively, the sensitive data can be redundantly sent over the voice channel and the data channel to assure greater chances of the data being received by the receiver. Furthermore, encryption of such critical data can be applied before being transmitted over the data channel and/or voice channel.

In another example, a smart phone 180 can have a banking mobile application in which a user of the smart phone 108 transfers money to another person, Adam Smith. Adam Smiths' account number and routing number can be saved on the smart phone 180. By simply pressing the touchscreen of the smart phone 180 at virtual button 182 the user can transfer funds from his/her bank account to Adam Smith's bank account, whose banking information is locally saved. The banking mobile application can transmit Adam Smith's sensitive banking data to the user's bank to complete the transfer. Adam Smith's account number and banking number are transmitted via the wired or wireless data communications network, e.g., the internet via a WiFi connection.

In certain embodiments of the present disclosure, some of that sensitive data of Adam Smith can be transferred via a voice channel using the methods, apparatuses, and systems of the present disclosure and the remaining portion of that sensitive data can be transferred via a data communications channel. In this manner, any application data intercepted from the data channel or from the voice channel may not be adequate to reconstruct Adam Smith's banking data. Thereby, a safe means for conducting mobile banking is provided.

Likewise for mobile health applications, safety, security, and timely arrival of personal data are paramount issues of importance. Critical data can be sent through the voice channel in conjunction with non-critical data sent on the data channel. The critical data can also be sent as redundant transmission given the data channel has the capability of recovering the encoded data. Protocols can be designed specifically to target these types of tasks.

While the disclosure has been described with reference to certain embodiments, it is to be understood that the disclosure is not limited to such embodiments. Rather, the disclosure should be understood and construed in its broadest meaning, as reflected by the following claims. Thus, these claims are to be understood as incorporating not only the apparatuses, methods, and systems described herein, but all those other and further alterations and modifications as would be apparent to those of ordinary skilled in the art.

We claim:

1. A modem for communicating application data over a voice channel, comprising:

an adaptive modulator, wherein the adaptive modulator modulates application data as a function of a source application of the application data and feedback information;

a mixer, wherein the modulated application data is inputted to the mixer to generate mixed data;

a vocoder, wherein the vocoder processes the mixed data for transmission through the voice channel;

a pattern recognition module, wherein the pattern recognition module receives a mixed-in signal and wherein the pattern recognition module separates voice data and received application data from the received mixed-in signal;

a demodulator, wherein the demodulator demodulates the received application data;

a descrambler, wherein the descrambler descrambles the received application data;

a bit-based log-likelihood-ratio ("LLR") estimator, wherein the bit-based LLR estimator estimates LLRs for bits of the descrambled application data;

a symbol LLR estimator, wherein the symbol LLR estimator estimates LLRs for symbols of the descrambled application data;

a second scrambler, wherein the second scrambler scrambles the estimated LLRs for the bits of the descrambled application data;

a probabilistic sequence estimator module, wherein the probabilistic sequence estimator module selects a best generated result from the bit-based LLR estimator; and an error detection module, wherein the error detection module applies error detection on the best generated result from the probabilistic sequence estimator module.

2. The modem of claim 1 wherein one or more modulation waveforms is determined as a function of the source application of the application data and the feedback information and wherein the determined one or more modulation waveforms is used to modulate the application data.

3. The modem of claim 2 further comprising an adaptive control interface ("ACI"), wherein the ACI operates the adaptive modulator and wherein the ACI determines the determined one or more modulation waveforms as a function of the source application and the feedback information.

4. The modem of claim 2 wherein the adaptive modulator applies a plurality of modulation waveforms to the application data to generate multiple modulated copies of the application data, and wherein the multiple modulated copies of the application data are processed by the vocoder for transmission over the voice channel.

5. The modem of claim 1 further comprising
a cyclic redundancy check ("CRC") module;
a forward error correction ("FEC") module; and
a scrambler,
wherein the application data is inputted to the CRC module,
wherein the output of the CRC module is inputted to the FEC module,
wherein the output of the FEC module is inputted to the scrambler,
wherein the output of the scrambler is inputted to the adaptive modulator, and
wherein the ACI operates the CRC module, FEC module, and the scrambler on the fly as a function of the feedback information.

6. The modem of claim 1 wherein the mixed-in signal has headers before the voice data and the received application data and wherein the headers are used to identify data types.

7. The modem of claim 1 wherein the pattern recognition module identifies speech patterns in the mixed-in signal, wherein the portions of the mixed-in signal that are identified as the speech patterns are processed as the voice data, and wherein remaining portions of the mixed-in signal are processed as the received application data.

8. The modem of claim 1 wherein the application data is a portion of sensitive data, and wherein the remaining portion of the sensitive data is transported via a data communications network.

9. A modem for communicating application data over a voice channel, comprising:

an adaptive modulator, wherein the adaptive modulator modulates application data as a function of a source application of the application data and feedback information, wherein one or more modulation waveforms is determined as a function of the source application of the application data and the feedback information, and wherein the determined one or more modulation waveforms are used to modulate the application data;

an adaptive control interface ("ACI"), wherein the ACI operates the adaptive modulator and wherein the ACI determines the determined one or more modulation waveforms as a function of the source application and the feedback information;

a mixer, wherein the modulated application data is inputted to the mixer to generate mixed data;

a vocoder, wherein the vocoder processes the mixed data for transmission through the voice channel;

a cyclic redundancy check ("CRC") module;

a forward error correction ("FEC") module;

a scrambler, wherein the application data is inputted to the CRC module, wherein the output of the CRC module is inputted to the FEC module, wherein the output of the FEC module is inputted to the scrambler, wherein the output of the scrambler is inputted to the adaptive modulator, and wherein the ACI operates the CRC module, FEC module, and the scrambler on the fly as a function of the feedback information;

a demodulator, wherein the demodulator demodulates received application data;

a descrambler, wherein the descrambler descrambles the received application data;

a bit-based log-likelihood-ratio ("LLR") estimator, wherein the bit-based LLR estimator estimates LLRs for bits of the descrambled application data;

a symbol LLR estimator, wherein the symbol LLR estimator estimates LLRs for symbols of the descrambled application data;

a second scrambler, wherein the second scrambler scrambles the estimated LLRs for the bits of the descrambled application data;

a probabilistic sequence estimator module, wherein the probabilistic sequence estimator module selects a best generated result from the bit-based LLR estimator; and an error detection module, wherein the error detection module applies error detection on the best generated result from the probabilistic sequence estimator module.

10. The modem of claim 9 wherein the adaptive modulator applies a plurality of modulation waveforms to the application data to generate multiple modulated copies of the application data, and wherein the multiple modulated copies of the application data are processed by the vocoder for transmission over the voice channel.

11. The modem of claim 9 further comprising:
a pattern recognition module,
wherein the pattern recognition module receives a mixed-in signal,
wherein the pattern recognition module separates voice data and received application data from the received mixed-in signal,
wherein the mixed-in signal has headers before the voice data and the received application data,
wherein the headers are used to identify data types,
wherein the pattern recognition module identifies speech patterns in the mixed-in signal,
wherein the portions of the mixed-in signal that are identified as the speech patterns are processed as the voice data, and
wherein remaining portions of the mixed-in signal are processed as the received application data.

12. The modem of claim 9 wherein the application data is a portion of sensitive data, and wherein the remaining portion of the sensitive data is transported via a data communications network.

13. A modem for communicating application data over a voice channel, comprising:
an adaptive modulator, wherein the adaptive modulator modulates application data as a function of a source application of the application data and feedback information, wherein one or more modulation waveforms is determined as a function of the source application of the application data and the feedback information, and wherein the determined one or more modulation waveforms are used to modulate the application data;
an adaptive control interface ("ACI"), wherein the ACI operates the adaptive modulator and wherein the ACI determines the determined one or more modulation waveforms as a function of the source application and the feedback information;
a mixer, wherein the modulated application data is inputted to the mixer to generate mixed data;
a vocoder, wherein the vocoder processes the mixed data for transmission through the voice channel;
a cyclic redundancy check ("CRC") module;
a forward error correction ("FEC") module;
a scrambler;
a pattern recognition module;
a demodulator;
a descrambler;
a bit-based log-likelihood-ratio ("LLR") estimator;
a symbol LLR estimator;
a second scrambler;
a probabilistic sequence estimator module; and
an error detection module,
wherein the application data is inputted to the CRC module,
wherein the output of the CRC module is inputted to the FEC module,
wherein the output of the FEC module is inputted to the scrambler,
wherein the output of the scrambler is inputted to the adaptive modulator,
wherein the ACI operates the CRC module, FEC module, and the scrambler on the fly as a function of the feedback information,
wherein the pattern recognition module receives a mixed-in signal,
wherein the pattern recognition module separates voice data and received application data from the received mixed-in signal,
wherein the mixed-in signal has headers before the voice data and the received application data,
wherein the headers are used to identify data types,
wherein the pattern recognition module identifies speech patterns in the mixed-in signal,
wherein the portions of the mixed-in signal that are identified as the speech patterns are processed as the voice data,
wherein remaining portions of the mixed-in signal are processed as the received application data,
wherein the demodulator demodulates the received application data,
wherein the descrambler descrambles the received application data,
wherein the bit-based LLR estimator estimates LLRs for bits of the descrambled application data,
wherein the symbol LLR estimator estimates LLRs for symbols of the descrambled application data,
wherein the probabilistic sequence estimator module selects a best generated result from the bit-based LLR estimator, and
wherein the error detection module applies error detection on the best generated result from the probabilistic sequence estimator module.

14. The modem of claim 13 wherein the adaptive modulator applies a plurality of modulation waveforms to the application data to generate multiple modulated copies of the application data, and wherein the multiple modulated copies of the application data are processed by the vocoder for transmission over the voice channel.

15. The modem of claim 13 wherein the application data is a portion of sensitive data, and wherein the remaining portion of the sensitive data is transported via a data communications network.

* * * * *